(12) United States Patent
Hoshino et al.

(10) Patent No.: US 8,569,198 B2
(45) Date of Patent: Oct. 29, 2013

(54) EXHAUST GAS-PURIFYING CATALYST

(75) Inventors: Sho Hoshino, Kakegawa (JP); Akimasa Hirai, Kakegawa (JP); Kenichi Taki, Kakegawa (JP); Keiichi Narita, Kakegawa (JP); Satoshi Matsueda, Kakegawa (JP); Asuka Hori, Kakegawa (JP); Masahiro Kusaka, Kakegawa (JP)

(73) Assignee: Cataler Corporation, Shizouka (JP)

( * ) Notice: Subject to any disclaimer, the term of this patent is extended or adjusted under 35 U.S.C. 154(b) by 0 days.

(21) Appl. No.: 13/402,770

(22) Filed: Feb. 22, 2012

(65) Prior Publication Data

US 2012/0149557 A1 Jun. 14, 2012

Related U.S. Application Data

(63) Continuation of application No. PCT/JP2010/065541, filed on Sep. 9, 2010.

(30) Foreign Application Priority Data

Sep. 10, 2009 (JP) ................................. 2009-209580

(51) Int. Cl.
*B01J 27/053* (2006.01)

(52) U.S. Cl.
USPC ........... 502/217; 502/174; 502/439; 502/300; 502/328; 502/304; 502/201; 502/340

(58) Field of Classification Search
None
See application file for complete search history.

(56) References Cited

FOREIGN PATENT DOCUMENTS

| CN | 101053831 A | | 10/2007 |
|---|---|---|---|
| CN | 101842321 A | | 9/2010 |
| JP | 63-116741 A | | 5/1988 |
| JP | 1-242149 A | | 9/1989 |
| JP | 10-202101 A | | 8/1998 |
| JP | 2001-149757 | * | 6/2001 |
| JP | 2001-149757 A | | 6/2001 |
| JP | 2005-152775 | * | 6/2005 |
| JP | 2005-152775 A | | 6/2005 |

OTHER PUBLICATIONS

International Search Report mailed by the International Searching Authority (ISA/JP) on Dec. 14, 2010 in connection with PCT International Application No. PCT/JP2010/065541, filed Sep. 9, 2010.
Written Opinion of the International Searching Authority mailed by the International Searching Authority (ISA/JP) on Dec. 14, 2010 in connection with PCT International Application No. PCT/JP2010/065541, filed Sep. 9, 2010.

(Continued)

*Primary Examiner* — Melvin C Mayes
*Assistant Examiner* — Colette Nguyen
(74) *Attorney, Agent, or Firm* — John P. White; Cooper & Dunham LLP

(57) ABSTRACT

An exhaust gas-purifying catalyst includes first particles of oxygen storage material, second particles of one or more alkaline-earth metal elements and/or compounds thereof interposed between the first particles, and third particles of one or more precious metal elements interposed between the first particles. A spectrum of a first characteristic X-ray intensity for one of the one or more alkaline-earth metal elements and a spectrum of a second characteristic X-ray intensity for one of the one or more precious metal elements that are obtained by performing a line analysis using energy-dispersive X-ray spectrometry along a length of 500 nm have a correlation coefficient σ(AE,PM) of 0.70 or more.

12 Claims, 3 Drawing Sheets

(56) References Cited

OTHER PUBLICATIONS

Notification of Transmittal of Translation of the International Preliminary Report on Patentability, including International Preliminary Report on Patentability and Written Opinion of the International Searching Authority, mailed Apr. 19, 2012 in connection with PCT International Application No. PCT/JP2010/065541, filed Sep. 9, 2010.

Chinese official action (including English translation thereof) mailed on May 20, 2013 by the Chinese Patent Office, in connection with Chinese Patent Application No. 201080040191.4.

* cited by examiner

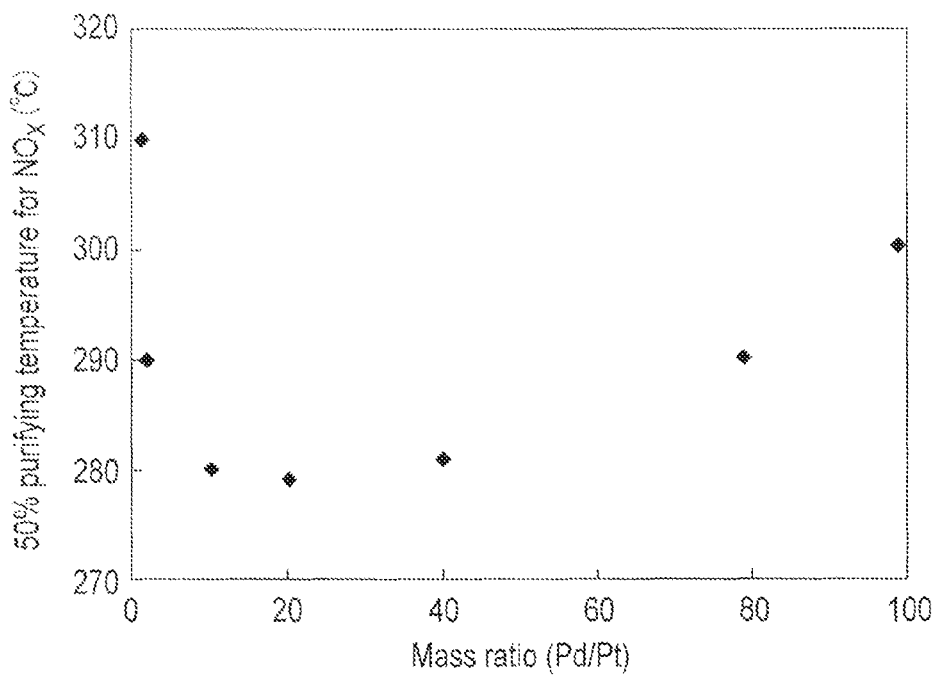
F I G. 5
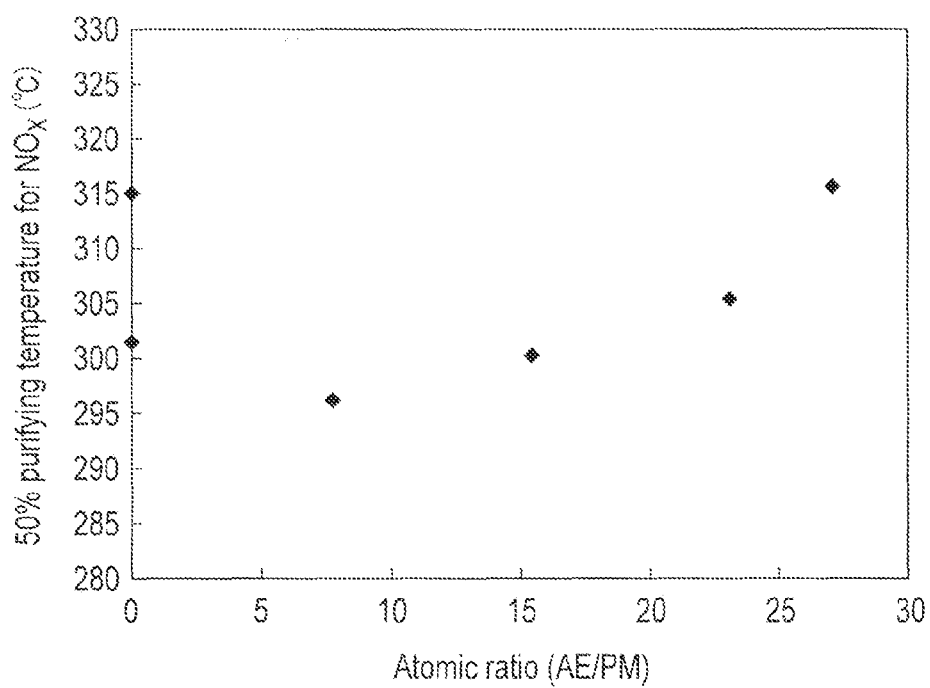
F I G. 6

EXHAUST GAS-PURIFYING CATALYST

CROSS REFERENCE TO RELATED APPLICATIONS

This application is a Continuation Application of PCT Application No. PCT/JP2010/065541, filed Sep. 9, 2010 and based upon and claiming the benefit of priority from prior Japanese Patent Application No. 2009-209580, filed Sep. 10, 2009, the entire contents of all of which are incorporated herein by reference.

BACKGROUND OF THE INVENTION

1. Field of the Invention

The present invention relates to an exhaust gas-purifying catalyst.

2. Description of the Related Art

Many automotive vehicles such as automobiles are equipped with a three-way catalyst as an exhaust gas-purifying catalyst. The three-way catalyst contains precious metals as catalytic metals. The precious metals promote the oxidation reactions of hydrocarbons (HC) and carbon monoxide (CO) and the reductive reactions of nitrogen oxides ($NO_x$).

Jpn. Pat. Appln. KOKAI Publication Nos. 63-116741, 01-242149, and 10-202101 describe exhaust gas-purifying catalysts containing a composite oxide of cerium oxide and zirconium oxide and a precious metal supported by the composite oxide. In these exhaust gas-purifying catalysts, the composite oxide is an oxygen storage material having an oxygen storage capacity. The oxygen storage material can optimize the above-described reductive reactions and oxidation reactions.

BRIEF SUMMARY OF THE INVENTION

In the above-described exhaust gas-purifying catalyst, poisoning of the precious metal by HC can be suppressed, for example, when using a mixture of a barium salt and an oxygen storage material supporting precious metal. The present inventors, however, believed that there was a possibility to improve the performance of such an exhaust gas-purifying catalyst in purifying $NO_x$ after a long-term use.

Thus, an object of the present invention is to provide a technique that is advantageous in improving $NO_x$-purifying performance after a long-term use.

According to an aspect of the present invention, there is provided an exhaust gas-purifying catalyst comprising first particles of oxygen storage material, second particles of one or more alkaline-earth metal elements and/or compounds thereof interposed between the first particles, and third particles of one or more precious metal elements interposed between the first particles, wherein a spectrum of a first characteristic X-ray intensity for one of the one or more alkaline-earth metal elements and a spectrum of a second characteristic X-ray intensity for one of the one or more precious metal elements that are obtained by performing a line analysis using energy-dispersive X-ray spectrometry along a length of 500 nm have a correlation coefficient $\sigma(AE,PM)$ of 0.70 or more, the coefficient $\sigma(AE,PM)$ being calculated from an equation:

$$\sigma(AE, PM) = \frac{\frac{1}{25} \times \sum_{n=1}^{25} [\{I_{AE}(n) - I_{AE}(Av)\} \times \{I_{PM}(n) - I_{PM}(Av)\}]}{\frac{1}{25} \times \sum_{n=1}^{25} [\{I_{AE}(n) - I_{AE}(Av)\}] \times \frac{1}{25} \times \sum_{n=1}^{25} [\{I_{PM}(n) - I_{PM}(Av)\}]}$$

in which $I_{AE}(Av)$ and $I_{PM}(Av)$ are mean values of the first and second characteristic X-ray intensities obtained along a length of 500 nm, respectively, and $I_{AE}(n)$ and $I_{PM}(n)$ are a mean value of the first characteristic X-ray intensity and a mean value of the second characteristic X-ray intensity that are obtained for an n-th interval of 25 intervals arranged in a line and each having a length of 20 nm, respectively.

BRIEF DESCRIPTION OF THE SEVERAL VIEWS OF THE DRAWING

FIG. 5 is a graph showing an example of influence that a mass ratio of palladium to platinum exerts on the $NO_x$-purifying performance after an endurance test; and FIG. 6 is a graph showing an example of influence that atomic mass ratio of an alkaline-earth metal element to a precious metal element exerts on the $NO_x$-purifying performance after an endurance test.

DETAILED DESCRIPTION OF THE INVENTION

Figure 1:
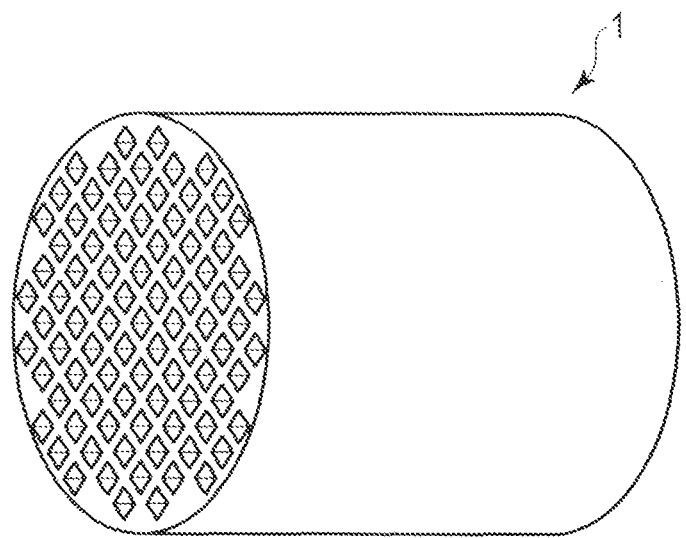
FIG. 1 is a perspective view schematically showing an exhaust gas-purifying catalyst according to an embodiment of the present invention.

Embodiments of the present invention will be described below with reference to the drawings. In the drawings, the same reference symbols denote components having the same or similar functions and duplicate descriptions will be omitted.

Figure 2:
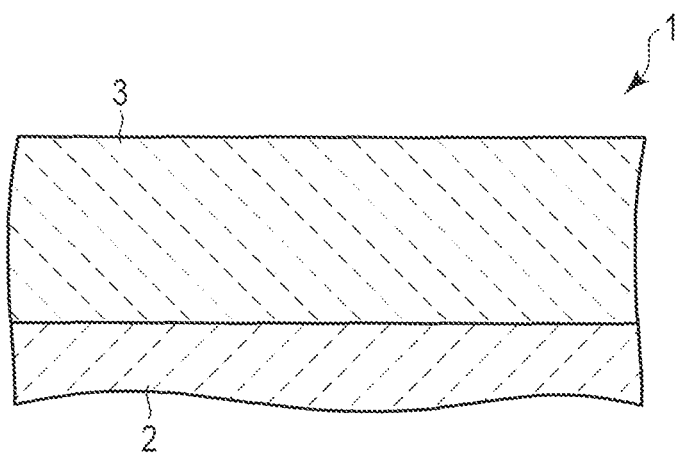
FIG. 2 is an enlarged cross-sectional view schematically showing a part of the exhaust gas-purifying catalyst shown in FIG. 1.
Figure 3:
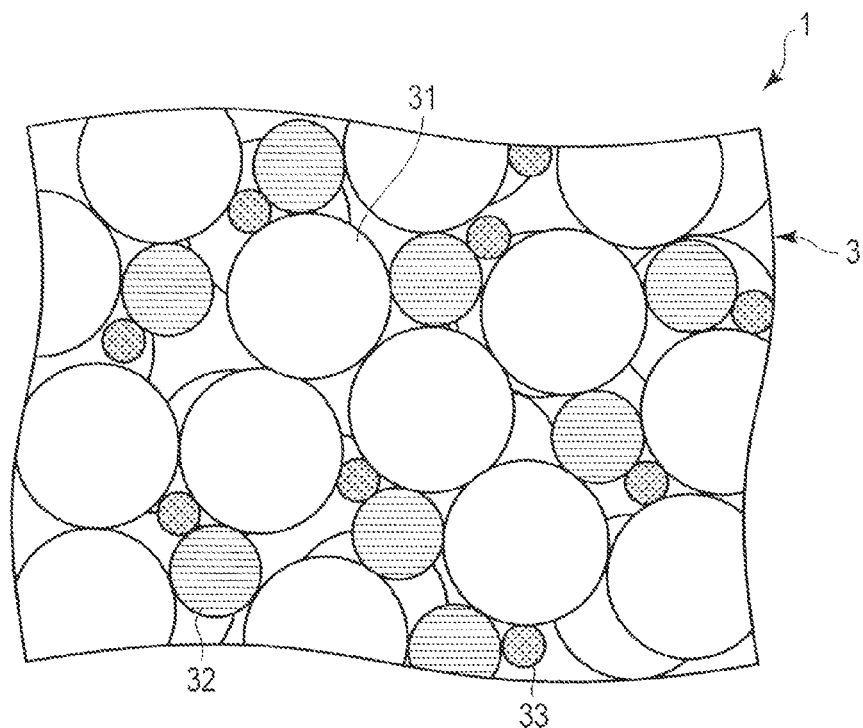
FIG. 3 is an enlarged cross-sectional view schematically showing a part of the exhaust gas-purifying catalyst shown in FIG. 1 at a higher magnification.

FIG. 1 is a perspective view schematically showing an exhaust gas-purifying catalyst according to an embodiment of the present invention. FIG. 2 is an enlarged cross-sectional view schematically showing a part of the exhaust gas-purifying catalyst shown in FIG. 1. FIG. 3 is an enlarged cross-sectional view schematically showing a part of the exhaust gas-purifying catalyst shown in FIG. 1 at a higher magnification.

The exhaust gas-purifying catalyst 1 shown in FIGS. 1 to 3 is a monolith catalyst. The exhaust gas-purifying catalyst 1 includes a substrate 2 such as a monolith honeycomb substrate. Typically, the substrate 2 is made of ceramic such as cordierite.

A catalytic layer 3 is formed on the partition walls of the substrate 2. The catalytic layer 3 includes first particles 31, second particles 32, and third particles 33.

The first particles 31 are evenly dispersed in the catalytic layer 3. Each of the particles 31 is made of an oxygen storage material. The oxygen storage material stores oxygen under an oxygen-rich condition and emits oxygen under an oxygen-lean condition so as to optimize the oxidation reactions of HC and CO and the reductive reactions of $NO_x$.

The oxygen storage material is, for example, ceria, a composite oxide of ceria with another metal oxide, or a mixture thereof. As the composite oxide, for example, a composite oxide of ceria and zirconia can be used.

The average particle diameter of the particles 31 fails within, for example, a range of 0.005 μm to 0.1 μm, typically a range of 0.01 μm to 0.03 μm. Note that the "average particle diameter" is the average particle diameter of primary particles described later and means the value obtained by the following method.

Firstly, a part of the catalytic layer 3 is removed from the exhaust gas-purifying catalyst 1. Next, using a scanning electron microscope (SEM), an SEM image of this sample is taken at a 50,000 to 200,000-fold magnification. Then, the particles in full view are selected from the oxygen storage material in the SEM image, and the area is obtained for each of the selected particles. Subsequently, diameters of circles having the same areas as the above-described areas are calculated, and an arithmetic mean of the diameters is obtained. The arithmetic mean is stated as the average particle diameter.

The second particles 32 are made of alkaline-earth metal element(s) and/or compound(s) thereof. The particles 32 may include only one alkaline-earth metal element or two or more alkaline-earth metal elements. Alternatively, the particles 32 may include only one compound of an alkaline-earth metal element or two or more compounds of alkaline-earth metal element(s). Alternatively, the particles 32 may be a mixture of one or more alkaline-earth elements and one or more compounds of alkaline-earth element(s). As the alkaline-earth element, for example, calcium, strontium, magnesium or barium can be used.

The alkaline-earth metal element(s) and/or compound(s) thereof suppress poisoning of the precious metal by HC. Note that the oxygen storage capacity of the particles 32 is lower than that of the particles 31. Typically, the particles 32 have no oxygen storage capacity.

The second particles 32 are supported by the first particles 31 and each positioned among the particles 31. Typically, the particles 32 are homogeneously mixed with the particles 31. For example, the particles 31 and 32 form a homogeneous mixture with almost no aggregate constituted only by either of them. That is, for example, almost no secondary particle constituted only by an oxygen storage material and almost no secondary particle constituted only by alkaline-earth metal element(s) and/or compound(s) thereof are present, and primary particles made of an oxygen storage material and primary particles made of alkaline-earth element(s) and/or compound(s) thereof form a homogeneous mixture in the catalytic layer 3.

A ratio of a number of mole of the alkaline-earth metal element(s) included in the particles 32 to a mass of the catalytic layer 3 or the sum of masses of the particles 31 to 33 falls within, for example, a range of $3.64 \times 10^{-6}$ to $2.55 \times 10^{-3}$ mol/g, typically a range of $7.28 \times 10^{-6}$ to $1.46 \times 10^{-3}$ mol/g. In the catalytic layer 3, an atomic ratio of the alkaline-earth metal element(s) to the precious metal element(s) falls within, for example, a range of $3.87 \times 10^{-2}$ to $2.71 \times 10$, typically a range of $7.75 \times 10^{-2}$ to $1.55 \times 10$. In the case where the ratios are set within the above-described ranges, HC- and $NO_N$-purifying performances after a long-term use can be improved as compared with the case where the ratios are set outside the above-described ranges.

The average particle diameter of the particles 32 falls within, for example, a range of 0.005 μm to 0.050 μm, and typically a range of 0.01 μm to 0.02 μm. Note that the "average particle diameter" is the average particle diameter of the above-described "primary particles" and means the value obtained by the same method as that described for the average particle diameter of the oxygen storage material.

The third particles 33 are made of precious metal(s). Each particle 33 is supported by at least one of the particles 31 and 32 and positioned among the particles 31. Typically, the particles 33 are homogeneously mixed with the particles 31. For example, the particles 31 and 33 form a homogeneous mixture with almost no aggregate constituted only by either of them. That is, for example, almost no secondary particle constituted only by an oxygen storage material and almost no secondary particle constituted only by precious metal(s) are present, and primary particles made of an oxygen storage material and primary particles made of precious metal(s) form a homogeneous mixture in the catalytic layer 3.

The precious metal elements promote the oxidation reactions of HC ad CO and the reductive reactions of $NO_x$. In addition, the precious metal elements supported by the oxygen storage material increase the oxygen storage capacity of the oxygen storage material.

The precious metal element(s) is, for example, platinum group element(s) such as palladium, platinum and rhodium. The particles 33 may include only one precious metal element or two or more precious metal elements. For example, the particles 33 may include only palladium or a mixture of palladium and platinum as the precious metal element(s).

In the case where the particles are made of a mixture of palladium and platinum, a mass ratio of palladium to platinum is set within, for example, a range of 2 to 80, and typically a range of 10 to 4. In the case where the mass ratio of palladium to platinum is set within the above-described range, HC- and $NO_x$-purifying performances after a long-term use can be improved as compared with the case where the mass ratio is set outside the above-described range.

The particles 33 have an average particle diameter smaller than the average particle diameter of the particles 31. The average particle diameter of the particles 33 falls within, for example, a range of 0.5 nm to 10 nm, and typically a range of 1 nm to 5 nm. Note that the "average particle diameter" is the average particle diameter of the above-described "primary particles" and means the value obtained by the same method as that described for the average particle diameter of the oxygen storage material.

In the case where the particles 32 and 33 are homogeneously mixed with the particles 31, the particles 31 to 33 form, for example, a homogeneous mixture with almost no aggregate constituted by only one of them. That is, for example, almost no secondary particle constituted only by an oxygen storage material, almost no secondary particle constituted only by alkaline-earth metal element(s) and/or compound(s) thereof, and almost no secondary particle constituted only by precious metal(s) are present, and primary particles made of an oxygen storage material, primary particles made of alkaline-earth metal element(s) and/or compound(s) thereof and primary particles made of precious metal(s) form a homogeneous mixture in the catalytic layer 3.

In the catalytic layer 3 of the exhaust gas-purifying catalyst 1, the particles 31 to 33 are dispersed with a relatively high uniformity. Specifically, when a line analysis using energy-dispersive X-ray spectrometry is performed along a length of 500 nm on the catalytic layer 3, a spectrum of a first characteristic X-ray intensity for one of the alkaline-earth element(s) and a spectrum of a second characteristic X-ray intensity for one of the precious metal element(s) have a correlation coefficient σ(AE,PM) of 0.70 or more. In the case where the particles 32 include two or more alkaline-earth metal elements or the particles 33 include two or more precious metal elements, typically, for all the combinations of the alkaline-earth metal element(s) of the particles 32 and the precious metal element(s) of the particles 33, the spectra of the first and second characteristic X-ray intensities have a correlation coefficient σ(AE,PM) of 0.70 or more.

Here, the correlation coefficient σ(AE,PM) is the value calculated from the following equation (1).

$$\sigma(AE, PM) = \frac{\frac{1}{25} \times \sum_{n=1}^{25} [\{I_{AE}(n) - I_{AE}(Av)\} \times \{I_{PM}(n) - I_{PM}(Av)\}]}{\frac{1}{25} \times \sum_{n=1}^{25} [\{I_{AE}(n) - I_{AE}(Av)\}] \times \frac{1}{25} \times \sum_{n=1}^{25} [\{I_{PM}(n) - I_{PM}(Av)\}]} \quad (1)$$

In the equation (1), $I_{AE}(Av)$ and $I_{PM}(Av)$ are mean values of the first and second characteristic X-ray intensities obtained along a length of 500 nm, respectively. $I_{AE}(n)$ and $I_{PM}(n)$ are a mean value of the first characteristic X-ray intensity and a mean value of the second characteristic X-ray intensity, respectively, which are obtained for an n-th interval of 25 intervals arranged in a line and each having a length of 20 nm.

The line analysis using energy-dispersive X-ray spectrometry may be performed on a surface of the catalytic layer 3 or a cross section of the catalytic layer 3. In the latter case, the direction of the line analysis may be the thickness direction or a direction perpendicular to the thickness direction.

As described above, the particles 31 and 33 are distributed in the catalytic layer 3 with a relatively high uniformity. Thus, in this catalytic layer 3, a large proportion of the particles 33 are the ones that are positioned near the particles 32. Therefore, poisoning of the precious metal by HC can be suppressed effectively.

Also, in the catalytic layer 3, a probability that a particle 31 exists between adjacent particles 32 and a probability that a particle 31 exists between adjacent particles 33 are high. Thus, sintering of the particles 31 and 32 is less prone to occur.

Therefore, the exhaust gas-purifying catalyst 1 can offer excellent HC- and $NO_x$-purifying performances for a long period of time.

Various modifications can be made to the above-described exhaust gas-purifying catalyst 1.

Figure 4:
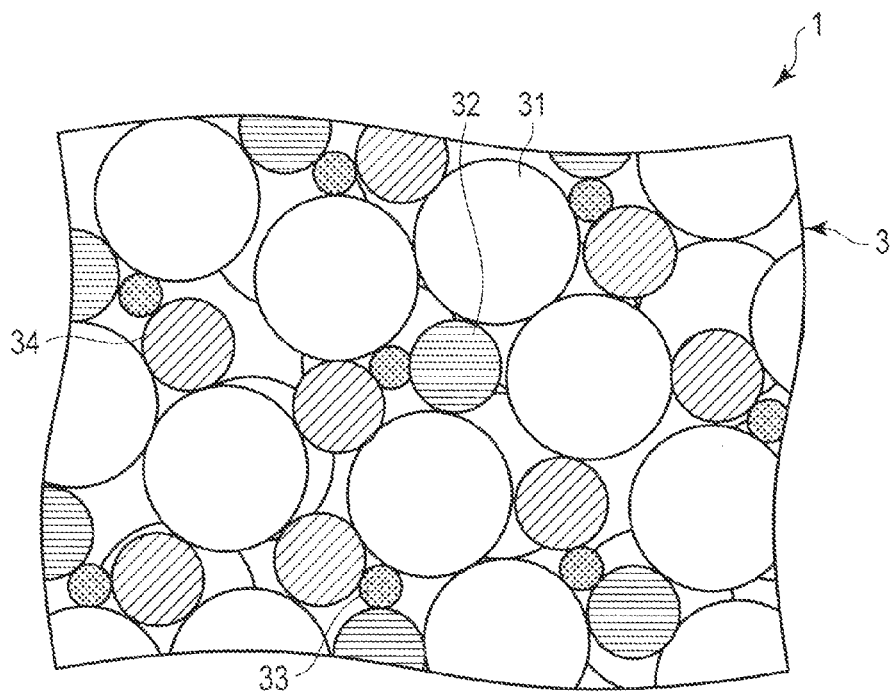
FIG. 4 is an enlarged cross-sectional view schematically showing a part of an exhaust gas-purifying catalyst according to a modified example.

FIG. 4 is an enlarged cross-sectional view schematically showing a part of an exhaust gas-purifying catalyst according to a modified example.

The exhaust gas-purifying catalyst 1 shown in FIG. 4 is the same as the exhaust gas-purifying catalyst 1 described with reference to FIGS. 1 to 3 except that the catalytic layer 3 further includes fourth particles 34.

The fourth particles 34 are made of rare-earth element(s) other than cerium and/or compound(s) thereof. The particles 34 may include only one rare-earth element other than cerium or two or more rare-earth elements other than cerium. Alternatively, the particles 34 may include only one compound of a rare-earth element other than cerium compounds or two or more compounds of rare-earth element(s) other than cerium compounds. Alternatively, the particles 34 may be a mixture of one or more rare-earth elements other than cerium and one or more compounds of rare-earth element(s) other than cerium compounds. As the rare-earth element other than cerium, for example, lanthanum or neodymium can be used.

The rare-earth element(s) other than cerium and/or compound(s) thereof promote the steam-reforming and water-gas shift reactions. Hydrogen produced by the reactions can be utilized for purifying $NO_x$. Note that the oxygen storage capacity of the particles 34 is lower than that of the particles 31. Typically, the particles 34 have no oxygen storage capacity.

The fourth particles 34 are supported by the first particles 31 and each positioned among the particles 31. Typically, the particles 34 are homogeneously mixed with the particles 31. For example, the particles 31 and 39 form a homogeneous mixture with almost no aggregate constituted only by either of them. That is, for example, almost no secondary particle constituted only by an oxygen storage material and almost no secondary particle constituted only by rare-earth element(s) other than cerium and/or compound(s) thereof are present, and primary particles made of an oxygen storage material and primary particles made of rare-earth element(s) other than cerium and/or compound(s) thereof form a homogeneous mixture in the catalytic layer 3.

A ratio of mass of the rare-earth element(s) contained in the particles 34 to mass of the catalytic layer 3 or total mass of the particles 31 to 34 falls within, for example, a range of 0.1% to 12% by mass, and typically a range of 0.1% to 10% by mass. A ratio of mass of the rare-earth element(s) contained in the particles 34 to mass of the particles 33 falls within, for example, a range of 0.1 to 12, and typically a range of 0.1 to 10. In the case where the mass ratios are set within the above-described ranges, HC- and $NO_x$-purifying performances after a long-term use can be improved as compared with the case where the mass ratios are set outside the above-described ranges.

The average particle diameter of the particles 34 falls within, for example, a range of 0.005 μm to 0.050 μm, and typically a range of 0.01 μm to 0.02 μm. Note that the "average particle diameter" is the average particle diameter of the above-described "primary particles" and means the value obtained by the same method as that described for the average particle diameter of the oxygen storage material.

In the catalytic layer 3 of the exhaust gas-purifying catalyst 1, the particles 31 to 34 are dispersed with a relatively high uniformity.

Specifically, when a line analysis using energy-dispersive X-ray spectrometry is performed along a length of 500 nm on the catalytic layer 3, a spectrum of a first characteristic X-ray intensity for one of the alkaline-earth element(s) and a spectrum of a second characteristic X-ray intensity for one of the precious metal element(s) have a correlation coefficient σ(AE,PM) of 0.70 or more. In the case where the particles 32 include two or more alkaline-earth metal elements or the particles 33 include two or more precious metal elements, typically, for all the combinations of the alkaline-earth metal element(s) of the particles 32 and the precious metal element(s) of the particles 33, the spectra of the first and second characteristic X-ray intensities have a correlation coefficient σ(AO,PM) of 0.70 or more.

Further, a spectrum of a third characteristic X-ray intensity for one of the rare-earth element(s) other than cerium and a spectrum of a second characteristic X-ray intensity for one of the precious metal element(s) have a correlation coefficient σ(AO,PM) of, for example, 0.68 or more, and typically 0.70 or more. In the case where the particles 34 include two or more rare-earth metal elements or the particles 33 include two or more precious metal elements, typically, for all the combinations of the rare-earth metal element(s) other than oxygen and the precious metal element(s), the spectra of the second and third characteristic X-ray intensities have a correlation coefficient σ(RE,PM) of, for example 0.68 or more, and typically 0.70 or more.

Here, the correlation coefficient σ(RE,PM) is the value calculated from the following equation (2).

$$\sigma(RE, PM) = \frac{\frac{1}{25} \times \sum_{n=1}^{25} [\{I_{RE}(n) - I_{RE}(Av)\} \times \{I_{PM}(n) - I_{PM}(Av)\}]}{\frac{1}{25} \times \sum_{n=1}^{25} [\{I_{RE}(n) - I_{RE}(Av)\}] \times \frac{1}{25} \times \sum_{n=1}^{25} [\{I_{PM}(n) - I_{PM}(Av)\}]} \quad (2)$$

In the equation (2), $I_{RE}(Av)$ is a mean value of the third characteristic X-ray intensity obtained along a length of 500 nm. $I_{RE}(n)$ is a mean value of the third characteristic X-ray intensity that is obtained for an n-th interval of 25 intervals arranged in a line and each having a length of 20 nm.

As described above, the particles 31 to 34 are distributed in the catalytic layer 3 with a relatively high uniformity. Therefore, when employing this structure, the same effect as that described with reference to FIGS. 1 to 3 can be obtained. Further, in this catalytic layer 3, a large proportion of the particles 34 are the ones that are positioned near the particles 33. Thus, Hydrogen produced by the steam-reforming and water-gas shift reactions can be utilized more efficiently for purifying $NO_x$.

Therefore, the exhaust gas-purifying catalyst 1 can offer excellent HC- and $NO_x$-purifying performances for a long period of time.

In the exhaust gas-purifying catalysts 1 described with reference to FIGS. 1 to 4, the catalytic layer 3 has a single layer structure. Instead, the catalytic layer 3 may have a multilayer structure. In this case, the above-described effects can be obtained when one or more layers included in the catalytic layer 3 has the structure described with reference to FIGS. 1 to 4.

Although the exhaust gas-purifying catalyst 1 described with reference to FIGS. 1 to 4 is a monolith catalyst, the above-described technique can be applied to a pellet catalyst.

EXAMPLES

Examples of the present invention will be described below.
<Manufacture of Catalyst C1>

An exhaust gas-purifying catalyst was manufactured by the following method.

1,300 mL of deionized water was added with 475 g of zirconium oxynitrate solution containing zirconium at a zirconium oxide ($ZrO_2$)-converted concentration of 10% by mass, 171 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 287.4 g of barium-containing solution containing barium at a barium carbonate ($BaCO_3$)-converted concentration of 5% by mass and 20 g of palladium nitrate solution containing palladium at a concentration of 5% by mass while sufficiently stirring the mixed solution so as to cause coprecipitation. Note that the barium-containing solution was prepared by dissolving barium methoxyethylate into toluene.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C1".
<Manufacture of Catalyst C2>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the mixed solution containing the precipitate was added with 17 g of barium sulfate powder having an average particle diameter of 0.05 μm ad 10 g of citric acid. After sufficiently stirred this, the precipitate was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C2".
<Manufacture of Catalyst C3>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and then dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C3".

<Manufacture of Catalyst C4>

A pellet catalyst was manufactured by the same method as that described for the catalyst C3 except that a mixed solution of 19.80 g of palladium nitrate solution containing palladium at a concentration of 5% by mass and 0.20 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C4".

<Manufacture of Catalyst C5>

A pellet catalyst was manufactured by the same method as that described for the catalyst C3 except that a mixed solution of 19.75 g of palladium nitrate solution containing palladium at a concentration of 5% by mass and 0.25 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C5".

<Manufacture of Catalyst C6>

A pellet catalyst was manufactured by the same method as that described for the catalyst C3 except that a mixed solution of 19.51 g of palladium nitrate solution containing palladium at a concentration of 5% by mass and 0.49 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C6".

<Manufacture of Catalyst C7>

A pellet catalyst was manufactured by the same method as that described for the catalyst C3 except that a mixed solution of 19.05 g of palladium nitrate solution containing palladium at a concentration of 5% by mass and 0.95 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C7".

<Manufacture of Catalyst C8>

A pellet catalyst was manufactured by the same method as that described for the catalyst C3 except that a mixed solution of 18.18 g of palladium nitrate solution containing palladium at a concentration of 5% by mass and 1.82 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C8".

<Manufacture of Catalyst C9>

A pellet catalyst was manufactured by the same method as that described for the catalyst C3 except that a mixed solution of 13.33 g of palladium nitrate solution containing palladium at a concentration of 5% by mass and 6.67 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C9".

<Manufacture of Catalyst C10>

A pellet catalyst was manufactured by the same method as that described for the catalyst C3 except that a mixed solution of 10 g of palladium nitrate solution containing palladium at a concentration of 5% by mass and 10 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C10".

<Manufacture of Catalyst C11>

A pellet catalyst was manufactured by the same method as that described for the catalyst C3 except that 20 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C11".

<Manufacture of Catalyst C12>

A pellet catalyst was manufactured by the same method as that described for the catalyst C3 except that 20 g of rhodium nitrate solution containing rhodium at a concentration of 5% by mass was used instead of 20 g of palladium nitrate solution containing palladium at a concentration of 5% by mass. Hereinafter, the pellet catalyst is referred to as "catalyst C12".

<Manufacture of Catalyst C13>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and washed with pure water. After drying the precipitate at 110° C., it was fired in the atmosphere at 700° C. for 5 hours to obtain a fired product in a form of powder.

Then, the powder was dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C13".

<Manufacture of Catalyst C14>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

Then, the precipitate thus obtained was separated from the solution by filtration and dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The powder was then dispersed into 500 mL of deionized water, and the dispersion was added with 20 g of palladium nitrate solution containing palladium at a concentration of 5% by mass so as to allow the powder in the dispersion to adsorb palladium. The dispersion was vacuum-filtrated, and the filtrate was subjected to inductively coupled plasma (ICP) spectrometry. As a result, it was revealed that the filter cake contained almost the entire palladium in the dispersion.

Then, the filter cake was dried at 110° C. Subsequently, it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C14".

<Manufacture of Catalyst C15>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the precipitate thus obtained was separated from the solution by filtration and washed with pure water. After drying the precipitate at 110° C., it was fired in the atmosphere at 700° C. for 5 hours to obtain a fired product in a form of powder.

The powder was then dispersed into 500 mL of deionized water, and the dispersion was added with 20 g of palladium nitrate solution containing palladium at a concentration of 5% by mass so as to allow the powder in the dispersion to adsorb palladium.

Then, the powder loaded with palladium was separated from the solution by filtration and dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C15".

<Manufacture of Catalyst C16>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, 30 g of yttrium nitrate solution containing yttrium at an yttrium oxide ($Y_2O_3$)-converted concentration of 10% by mass, and 20 g of palladium nitrate solution containing palladium at a concentration of 5% by mass. The mixed solution was added with an aqueous solution containing potassium hydroxide at a concentration of 20% by mass at room temperature until the pH value reached 12 while sufficiently stirring the mixed solution so as to cause coprecipitation.

Then, the coprecipitate thus obtained was separated from the solution by filtration and dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C16".

<Manufacture of Catalyst C17>

An exhaust gas-purifying catalyst was manufactured by the following method.

1,300 mL of deionized water was added with 475 g of zirconium oxynitrate solution containing zirconium at a zirconium oxide ($ZrO_2$)-converted concentration of 10% by mass, 171 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and washed with pure water. After drying the precipitate at 110° C., it was fired in the atmosphere at 700° C. for 5 hours to obtain a fired product in a form of powder.

Then, the powder was dispersed into 1,300 mL of deionized water. Further the dispersion was added with 287.4 g of barium-containing solution containing barium at a barium carbonate ($BaCO_3$)-converted concentration of 5% by mass so as to cause precipitation. Note that the barium-containing solution was prepared by dissolving barium methoxyethylate into toluene.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C17".

<Manufacture of Catalyst C18>

An exhaust gas-purifying catalyst was manufactured by the following method.

1,300 mL of deionized water was added with 459 g of zirconium oxynitrate solution containing zirconium at a zirconium oxide ($ZrO_2$)-converted concentration of 10% by mass, 165 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and washed with pure water. After drying the precipitate at 110° C., it was fired in the atmosphere at 700° C. for 5 hours to obtain a fired product in a form of powder.

Then, the powder was dispersed into 1,300 mL of deionized water. Further the dispersion was added with 17 g of barium sulfate powder having an average particle diameter of 0.05 μm and 10 g of citric acid. After sufficiently stirring the dispersion, the precipitate was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C18".

<Manufacture of Catalyst C19>

A pellet catalyst was manufactured by the same method as that described for the catalyst C3 except that the amount of the zirconium oxynitrate solution was changed from 459 g to 558 g, the amount of cerium nitrate solution was changed from 165 g to 201 g, the amount of sodium sulfate was changed from 10.4 g to 0.52 g, and the amount of barium oxide was changed from 11.2 g to 0.06 g. Hereinafter, the pellet catalyst is referred to as "catalyst C19".

<Manufacture of Catalyst C20>

A pellet catalyst was manufactured by the same method as that described for the catalyst C3 except that the amount of the zirconium oxynitrate solution was changed from 459 g to 557 g, the amount of cerium nitrate solution was changed from 165 g to 201 g, the amount of sodium sulfate was changed from 10.4 g to 1.04 g, and the amount of barium oxide was changed from 11.2 g to 0.11 g. Hereinafter, the pellet catalyst is referred to as "catalyst C20".

<Manufacture of Catalyst C21>

A pellet catalyst was manufactured by the same method as that described for the catalyst C3 except that the amount of the zirconium oxynitrate solution was changed from 459 g to 361 g, the amount of cerium nitrate solution was changed from 165 g to 130 g, the amount of sodium sulfate was changed from 10.4 g to 20.8 g, and the amount of barium oxide was changed from 11.2 g to 20.3 g. Hereinafter, the pellet catalyst is referred to as "catalyst C21".

<Manufacture of Catalyst C22>

A pellet catalyst was manufactured by the same method as that described for the catalyst C3 except that the amount of the zirconium oxynitrate solution was changed from 459 g to 262 g, the amount of cerium nitrate solution was changed from 165 g to 94 g, the amount of sodium sulfate was changed from 10.4 g to 31.2 g, and the amount of barium oxide was changed from 11.2 g to 33.5 g. Hereinafter, the pellet catalyst is referred to as "catalyst C22".

<Manufacture of Catalyst C23>

A pellet catalyst was manufactured by the same method as that described for the catalyst C3 except that the amount of the zirconium oxynitrate solution was changed from 459 g to 212 g, the amount of cerium nitrate solution was changed from 165 g to 76 g, the amount of sodium sulfate was changed from 10.4 g to 36.4 g, and the amount of barium oxide was changed from 11.2 g to 39.1 g. Hereinafter, the pellet catalyst is referred to as "catalyst C23".

<Manufacture of Catalyst C24>

An exhaust gas-purifying catalyst was manufactured by the following method.

1,300 mL of deionized water was added with 359 g of zirconium oxynitrate solution containing zirconium at a zirconium oxide ($ZrO_2$)-converted concentration of 10% by mass, 129 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and then dispersed into a mixed solution containing 600 mL of toluene, 10 g of lauric acid, and 0.3 g of trifluoroacetic acid. Further, the mixed solution was added with 14 g of calcium oxide and an aqueous solution containing 35.7 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C24".

<Manufacture of Catalyst C25>

An exhaust gas-purifying catalyst was manufactured by the following method.

1,300 mL of deionized water was added with 359 g of zirconium oxynitrate solution containing zirconium at a zirconium oxide ($ZrO_2$)-converted concentration of 10% by mass, 129 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

The precipitate thus obtained was separated from the solution by filtration and washed with pure water. After drying the precipitate at 110° C., it was fired in the atmosphere at 700° C. for 5 hours to obtain a fired product in a form of powder.

The powder was then dispersed into a mixed solution containing 600 mL of toluene, 10 g of lauric acid, and 0.3 g of trifluoroacetic acid. Further, the mixed solution was added with 14 g of calcium oxide and an aqueous solution containing 35.7 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C25".

<Manufacture of Catalyst C26>

An exhaust gas-purifying catalyst was manufactured by the following method.

1,300 mL of deionized water was added with 436 g of zirconium oxynitrate solution containing zirconium at a zirconium oxide ($ZrO_2$)-converted concentration of 10% by mass, 157 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and then dispersed into a mixed solution containing 600 mL of toluene, 10 g of lauric acid, and 0.3 g of trifluoroacetic acid. Further, the mixed solution was added with 12 g of strontium oxide and an aqueous solution containing 16.3 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C26".

<Manufacture of Catalyst C27>

An exhaust gas-purifying catalyst was manufactured by the following method.

1,300 mL of deionized water was added with 436 g of zirconium oxynitrate solution containing zirconium at a zirconium oxide ($ZrO_2$)-converted concentration of 10% by mass, 157 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

The precipitate thus obtained was separated from the solution by filtration and washed with pure water. After drying the precipitate at 110° C., it was fired in the atmosphere at 700° C. for 5 hours to obtain a fired product in a form of powder.

The powder was then dispersed into a mixed solution containing 600 mL of toluene, 10 g of lauric acid, and 0.3 g of trifluoroacetic acid. Further, the mixed solution was added with 12 g of strontium oxide and an aqueous solution containing 16.3 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C27".

<Manufacture of Catalyst C28>

An exhaust gas-purifying catalyst was manufactured by the following method.

1,300 mL of deionized water was added with 268 g of zirconium oxynitrate solution containing zirconium at a zirconium oxide ($ZrO_2$)-converted concentration of 10% by mass, 96.5 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

Then, the precipitate thus obtained was separated from the solution by filtration and then dispersed into a mixed solution containing 600 mL of toluene, 10 g of lauric acid, and 0.3 g of trifluoroacetic acid. Further, the mixed solution was added with 16.6 g of magnesium oxide and an aqueous solution containing 58.5 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C28".

<Manufacture of Catalyst C29>

An exhaust gas-purifying catalyst was manufactured by the following method.

1,300 mL of deionized water was added with 268 g of zirconium oxynitrate solution containing zirconium at a zirconium oxide ($ZrO_2$)-converted concentration of 10% by mass, 96.5 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution so as to cause precipitation.

The precipitate thus obtained was separated from the solution by filtration and washed with pure water. After drying the precipitate at 110° C., it was fired in the atmosphere at 700° C. for 5 hours to obtain a fired product in a form of powder.

The powder was then dispersed into a mixed solution containing 600 mL of toluene, 10 g of lauric acid, and 0.3 g of trifluoroacetic acid. Further, the mixed solution was added with 16.6 g of magnesium oxide and an aqueous solution containing 58.5 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C29".

<Manufacture of Catalyst C30>

An exhaust gas-purifying catalyst was manufactured by the following method.

1,300 mL of deionized water was added with 442 g of zirconium oxynitrate solution containing zirconium at a zirconium oxide ($ZrO_2$)-converted concentration of 10% by mass, 159 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass and 30 g of lanthanum nitrate solution containing lanthanum at a lanthanum oxide ($La_2O_3$)-converted concentration of 10% by mass while sufficiently stirring the mixed solution so as to cause coprecipitation.

Then, the coprecipitate thus obtained was separated from the solution by filtration and then dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 29 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C30".

<Manufacture of Catalyst C31>

An exhaust gas-purifying catalyst was manufactured by the following method.

1,300 mL of deionized water was added with 442 g of zirconium oxynitrate solution containing zirconium at a zirconium oxide ($ZrO_2$)-converted concentration of 10% by mass, 159 g of cerium nitrate solution containing cerium at a cerium oxide ($CeO_2$)-converted concentration of 20% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass and 30 g of lanthanum nitrate solution containing lanthanum at a lanthanum oxide ($La_2O_3$)-converted concentration of 10% by mass while sufficiently stirring the mixed solution so as to cause precipitation.

The coprecipitate thus obtained was separated from the solution by filtration and washed with pure water. After drying the precipitate at 110° C., it was fired in the atmosphere at 700° C. for 5 hours to obtain a fired product in a form of powder.

The powder was then dispersed into a mixed solution containing 600 mL of toluene, 10 g of lauric acid, and 0.3 g of trifluoroacetic acid. Further, the mixed solution was added with 11.2 g of barium oxide and an aqueous solution containing 10.4 g of sodium sulfate ($Na_2SO_4$) in this order, and then stirred at 65° C. for 24 hours so as to obtain a precipitate.

Then, the precipitate thus obtained was separated from the solution by filtration and washed with pure water. After drying the precipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C31".

<Dispersity Evaluation>

A line analysis was performed along a length of 500 nm on each of the catalysts C1 to C31 using energy dispersive X-ray spectrometry, to be more specific, field emission-scanning electron microscope-energy dispersive X-ray analysis (FE-SEM-EDX). For the line analysis, used was ultra-high resolution field-emission scanning electron microscope S-4800 manufactured by Hitachi High-Technologies Corporation.

Then, a correlation coefficient σ(Ce,PM) for the spectra of the characteristic X-ray intensities obtained for cerium and a respective precious metal element was calculated from the following equation (3). In addition, a correlation coefficient σ(Ce,AE) for the spectra of the characteristic X-ray intensities obtained for cerium and a respective alkaline-earth metal element was calculated from the following equation (4). Further, a correlation coefficient σ(AE,PM) for the spectra of the characteristic X-ray intensities obtained for a respective alkaline-earth metal element and a respective precious metal element was calculated from the following equation (5).

$$\sigma(Ce, PM) = \frac{\frac{1}{25} \times \sum_{n=1}^{25} [\{I_{Ce}(n) - I_{Ce}(Av)\} \times \{I_{PM}(n) - I_{PM}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{PM}(n) - I_{PM}(Av)\}]} \quad (3)$$

$$\sigma(Ce, AE) = \frac{\frac{1}{25} \times \sum_{n=1}^{25} [\{I_{Ce}(n) - I_{Ce}(Av)\} \times \{I_{AE}(n) - I_{AE}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{AE}(n) - I_{AE}(Av)\}]} \quad (4)$$

$$\sigma(AE, PM) = \frac{\frac{1}{25} \times \sum_{n=1}^{25} [\{I_{AE}(n) - I_{AE}(Av)\} \times \{I_{PM}(n) - I_{PM}(Av)\}]}{\frac{1}{25} \times \sum_{n=1}^{25} [\{I_{AE}(n) - I_{AE}(Av)\}] \times \frac{1}{25} \times \sum_{n=1}^{25} [\{I_{PM}(n) - I_{PM}(Av)\}]} \quad (5)$$

In the equations (3) and (4), $I_{CE}(Av)$ is a mean value of the characteristic X-ray intensity obtained for cerium along a length of 500 nm, and $I_{CE}(n)$ is a mean value of the characteristic X-ray intensity for cerium that is obtained for an n-th interval of 25 intervals arranged in a line and each having a length of 20 nm. In the equations (3) and (5), $I_{PM}(Av)$ is a mean value of the characteristic X-ray intensity obtained for palladium, platinum or rhodium along a length of 500 nm, and $I_{PM}(n)$ is a mean value of the characteristic X-ray intensity for palladium, platinum or rhodium that is obtained for an n-th interval of 25 intervals arranged in a line and each having a length of 20 nm. In the equations (4) and (5), $I_{AE}(Av)$ is a mean value of the characteristic X-ray intensity obtained for barium, calcium, strontium or magnesium along a length of 500 nm, and $I_{La}(n)$ is a mean value of the characteristic X-ray intensity for barium, calcium, strontium or magnesium that is obtained for an n-th interval of 25 intervals arranged in a line and each having a length of 20 nm.

The correlation coefficients and composition of each catalyst are summarized in TABLES 1 to 3 below.

<Endurance Evaluation>

Performances of the catalysts C1 to C31 were checked by the following method.

First, each of the catalysts C1 to C31 was set in a flow-type endurance test apparatus, and a gas containing nitrogen as a main component was made to flow through the catalyst bed at a flow rate of 500 mL/minute for 30 hours. During this period, the temperature of the catalyst bed was held at 900° C. As the gas made to flow through the catalyst bed, a lean gas and a rich gas were used, and these gases were switched at intervals of 5 minutes. Note that the lean gas was a mixed gas prepared by adding oxygen to nitrogen at a concentration of 1%, while the rich gas was a mixed gas prepared by adding carbon monoxide to nitrogen at a concentration of 2%.

Then, each of the C1 to C31 was set in an atmospheric fixed bed flow reactor. Subsequently, the temperature of the catalyst bed was raised from 100° C. to 500° C. at the temperature increase rate of 12° C./minute and the exhaust gas-purifying ratio was continuously measured while a model gas was made to flow through the catalyst bed. As the model gas, used was a gas corresponding to a lean atmosphere with an air-to-fuel ratio (A/F) equal to the theoretical air-to-fuel ratio. The results were summarized in TABLES 1 to 3 below.

Further, for each of the catalysts C1 to C31 after the above-described endurance test, the average particle diameter of the precious metal particles was calculated from an X-ray diffraction peak. The results were summarized in TABLES 1 to 3 below.

TABLE 1

| Catalyst | Composition | PM conc. (mol/g) | AE conc. (mol/g) | AE/PM (mol/mol) | La conc. (mass %) | AE compound | 50% purifying temperature (° C.) HC | NO$_x$ | Average particle diameter of precious metal (nm) | σ(Ce, PM) | σ(Ce, AE) | σ(AE, PM) |
|---|---|---|---|---|---|---|---|---|---|---|---|---|
| C1 | Pd/Ba/CZY | $9.397 \times 10^{-5}$ | $7.28 \times 10^{-4}$ | 7.7472 | 0 | Ba carbonate | 320 | 301 | 31 | 0.8 | 0.75 | 0.73 |
| C2 | Pd/Ba/CZY | $9.397 \times 10^{-5}$ | $7.28 \times 10^{-4}$ | 7.7472 | 0 | Ba sulfate | 315 | 295 | 28 | 0.79 | 0.79 | 0.75 |
| C3 | Pd/Ba/CZY | $9.397 \times 10^{-5}$ | $7.28 \times 10^{-4}$ | 7.7472 | 0 | Ba sulfate | 315 | 296 | 27 | 0.78 | 0.79 | 0.75 |
| C4 | Pd/Pt/Ba/CZY (Pd/Pt = 99) | Pd: $9.304 \times 10^{-5}$ Pt: $5.1 \times 10^{-7}$ | $7.28 \times 10^{-4}$ | 7.7819 | 0 | Ba sulfate | 320 | 300 | 29 | 0.76 (Pd) 0.77 (Pt) | 0.77 | 0.75 (Pd) 0.74 (Pt) |
| C5 | Pd/Pt/Ba/CZY (Pd/Pt = 80) | Pd: $9.281 \times 10^{-5}$ Pt: $6.3 \times 10^{-7}$ | $7.28 \times 10^{-4}$ | 7.7911 | 0 | Ba sulfate | 306 | 290 | 25 | 0.77 (Pd) 0.76 (Pt) | 0.78 | 0.74 (Pd) 0.73 (Pt) |
| C6 | Pd/Pt/Ba/CZY (Pd/Pt = 40) | Pd: $9.167 \times 10^{-5}$ Pt: $1.25 \times 10^{-6}$ | $7.28 \times 10^{-4}$ | 7.8347 | 0 | Ba sulfate | 301 | 281 | 22 | 0.79 (Pd) 0.78 (Pt) | 0.79 | 0.75 (Pd) 0.76 (Pt) |
| C7 | Pd/Pt/Ba/CZY (Pd/Pt = 20) | Pd: $8.949 \times 10^{-5}$ Pt: $2.44 \times 10^{-6}$ | $7.28 \times 10^{-4}$ | 7.9191 | 0 | Ba sulfate | 300 | 279 | 21 | 0.79 (Pd) 0.80 (Pt) | 0.80 | 0.77 (Pd) 0.77 (Pt) |
| C8 | Pd/Pt/Ba/CZY (Pd/Pt = 10) | Pd: $8.542 \times 10^{-5}$ Pt: $4.66 \times 10^{-6}$ | $7.28 \times 10^{-4}$ | 8.0817 | 0 | Ba sulfate | 301 | 280 | 22 | 0.79 (Pd) 0.79 (Pt) | 0.79 | 0.76 (Pd) 0.76 (Pt) |
| C9 | Pd/Pt/Ba/CZY (Pd/Pt = 2) | Pd: $6.264 \times 10^{-5}$ Pt: $1.709 \times 10^{-5}$ | $7.28 \times 10^{-4}$ | 9.1308 | 0 | Ba sulfate | 306 | 290 | 22 | 0.78 (Pd) 0.77 (Pt) | 0.76 | 0.74 (Pd) 0.73 (Pt) |
| C10 | Pd/Pt/Ba/CZY (Pd/Pt = 1) | Pd: $4.698 \times 10^{-5}$ Pt: $2.563 \times 10^{-5}$ | $7.28 \times 10^{-4}$ | 10.0262 | 0 | Ba sulfate | 320 | 310 | 21 | 0.76 (Pd) 0.76 (Pt) | 0.75 | 0.72 (Pd) 0.72 (Pt) |
| C11 | Pt/Ba/CZY | $5.126 \times 10^{-5}$ | $7.28 \times 10^{-4}$ | 14.2021 | 0 | Ba sulfate | 323 | 323 | 16 | 0.77 | 0.78 | 0.73 |
| C12 | Rh/Ba/CZY | $9.718 \times 10^{-5}$ | $7.28 \times 10^{-4}$ | 7.4913 | 0 | Ba sulfate | 345 | 335 | ND | 0.77 | 0.78 | 0.73 |

TABLE 2

| Catalyst | Composition | PM conc. (mol/g) | AE conc. (mol/g) | AE/PM (mol/mol) | La conc. (mass %) | AE compound | 50% purifying temperature (° C.) HC | NO$_x$ | Average particle diameter of precious metal (nm) | σ(Ce, PM) | σ(Ce, AE) | σ(AE, PM) |
|---|---|---|---|---|---|---|---|---|---|---|---|---|
| C13 | Pd/Ba/CZY | $9.397 \times 10^{-5}$ | $7.28 \times 10^{-4}$ | 7.7472 | 0 | Ba sulfate | 340 | 320 | 30 | 0.77 | 0.43 | 0.36 |
| C14 | Pd/Ba/CZY | $9.397 \times 10^{-5}$ | $7.28 \times 10^{-4}$ | 7.7472 | 0 | Ba sulfate | 345 | 324 | 41 | 0.46 | 0.76 | 0.40 |
| C15 | Pd/Ba/CZY | $9.397 \times 10^{-5}$ | $7.28 \times 10^{-4}$ | 7.7472 | 0 | Ba sulfate | 355 | 336 | 39 | 0.40 | 0.43 | 0.33 |
| C16 | Pd/Ba/CZY | $9.397 \times 10^{-5}$ | $7.28 \times 10^{-4}$ | 7.7472 | 0 | Ba sulfate | 345 | 326 | 32 | 0.76 | 0.73 | 0.65 |
| C17 | Pd/Ba/CZY | $9.397 \times 10^{-5}$ | $7.28 \times 10^{-4}$ | 7.7472 | 0 | Ba sulfate | 344 | 325 | 33 | 0.75 | 0.44 | 0.41 |
| C18 | Pd/Ba/CZY | $9.397 \times 10^{-5}$ | $7.28 \times 10^{-4}$ | 7.7472 | 0 | Ba sulfate | 340 | 319 | 32 | 0.79 | 0.46 | 0.45 |
| C19 | Pd/Ba/CZY | $9.397 \times 10^{-5}$ | $3.64 \times 10^{-6}$ | 0.0387 | 0 | Ba sulfate | 335 | 315 | 30 | 0.75 | 0.73 | 0.70 |
| C20 | Pd/Ba/CZY | $9.397 \times 10^{-5}$ | $7.28 \times 10^{-6}$ | 0.0775 | 0 | Ba sulfate | 320 | 301 | 28 | 0.78 | 0.78 | 0.74 |
| C21 | Pd/Ba/CZY | $9.397 \times 10^{-5}$ | $1.46 \times 10^{-3}$ | 15.5369 | 0 | Ba sulfate | 321 | 300 | 28 | 0.79 | 0.79 | 0.76 |
| C22 | Pd/Ba/CZY | $9.397 \times 10^{-5}$ | $2.18 \times 10^{-3}$ | 23.1989 | 0 | Ba sulfate | 325 | 305 | 29 | 0.78 | 0.80 | 0.74 |
| C23 | Pd/Ba/CZY | $9.397 \times 10^{-5}$ | $2.55 \times 10^{-3}$ | 27.1363 | 0 | Ba sulfate | 335 | 315 | 32 | 0.74 | 0.74 | 0.71 |

TABLE 3

| Catalyst | Composition | PM conc. (mol/g) | AE conc. (mol/g) | AE/PM (mol/mol) | La conc. (mass %) | AE compound | 50% purifying temperature (° C.) HC | NO$_x$ | Average particle diameter of precious metal (nm) | σ(Ce, PM) | σ(Ce, AE) | σ(AE, PM) |
|---|---|---|---|---|---|---|---|---|---|---|---|---|
| C24 | Pd/Ca/CZY | $9.397 \times 10^{-5}$ | $2.50 \times 10^{-3}$ | 26.6042 | 0 | Ca sulfate | 330 | 311 | 27 | 0.76 | 0.77 | 0.72 |
| C25 | Pd/Ca/CZY | $9.397 \times 10^{-5}$ | $2.50 \times 10^{-3}$ | 26.6042 | 0 | Ca sulfate | 360 | 339 | 40 | 0.73 | 0.46 | 0.40 |
| C26 | Pd/Sr/CZY | $9.397 \times 10^{-5}$ | $1.14 \times 10^{-3}$ | 12.1315 | 0 | Sr sulfate | 320 | 301 | 28 | 0.75 | 0.73 | 0.70 |
| C27 | Pd/Sr/CZY | $9.397 \times 10^{-5}$ | $1.14 \times 10^{-3}$ | 12.1315 | 0 | Sr sulfate | 345 | 323 | 40 | 0.75 | 0.41 | 0.39 |
| C28 | Pd/Mg/CZY | $9.397 \times 10^{-5}$ | $4.11 \times 10^{-3}$ | 43.7374 | 0 | Mg sulfate | 354 | 315 | 28 | 0.76 | 0.75 | 0.72 |
| C29 | Pd/Mg/CZY | $9.397 \times 10^{-5}$ | $4.11 \times 10^{-3}$ | 43.7374 | 0 | Mg sulfate | 365 | 343 | 41 | 0.74 | 0.44 | 0.40 |
| C30 | Pd/Ba/La/CZY | $9.397 \times 10^{-5}$ | $7.28 \times 10^{-4}$ | 7.7472 | 1 | Ba sulfate | 303 | 284 | 27 | 0.75 | 0.76 | 0.74 |
| C31 | Pd/Ba/La/CZY | $9.397 \times 10^{-5}$ | $7.28 \times 10^{-4}$ | 7.7472 | 1 | Ba sulfate | 324 | 303 | 39 | 0.77 | 0.45 | 0.38 |

In the columns of TABLES 1 to 3 labeled with "Composition", "CZY" represents a composite oxide containing cerium, zirconium and yttrium. "PM conc." represents a concentration of a precious metal, "AE conc." represents a concentration of an alkaline-earth metal, "AE/PM" represents an atomic ratio of an alkaline-earth metal to a precious metal, and "La conc." represents a concentration of lanthanum. The cells in the columns labeled with "AE compound" indicate forms of the alkaline-earth metal element of the catalysts C1 to C31. Each value in the columns labeled with "50% purifying temperature" represents the lowest temperature of the catalyst bed at which 50% or more of the respective component of the model gas was purified. Specifically, the columns labeled with "HC" and "$NO_x$" show the data obtained for hydrocarbons and the data obtained for nitrogen oxides, respectively. "ND" in the columns labeled with "Average particle diameter of precious metal" indicates that no diffraction peak was detected.

As shown in TABLE 1, although the catalysts C1 to C3 had the same composition as that of the catalysts C13 to C18, the catalysts C1 to C3 had correlation coefficients σ(Ce,PM) and σ(Ce,AE) that were equal to or greater than those of the catalysts C13 to C18 and had correlation coefficients σ(AE, PM) that were greater than those of the catalysts C13 to C18. The catalysts C1 to C3 had average particle diameters of the precious metal after a long-term use that were almost equal to or smaller than the average particle diameters of the precious metal of the catalysts C13 to C18 after a long-term use. In addition, the catalysts C1 to C3 were excellent in the HC- and $NO_x$-purifying performances after a long-term use as compared with the catalysts C13 to C18. This reveals that the correlation coefficients σ(Ce,PM), σ(Ce,AE) and σ(AE,PM), in particular, the correlation coefficient σ(AE,PM) have an effect on the endurance of the catalyst.

The catalysts C2 and C3 achieved lower 50% purifying temperature for HC and $NO_x$ as compared with the catalyst C1 in spite of the fact that the catalysts C1 to C3 had the same composition. The reason is considered as follows. In the manufacturing process of the catalyst C1 that contains an alkaline-earth metal element in a form of carbonate, a relatively large amount of alkaline-earth metal element dissolves in a solution. Thus, it is difficult to distribute the alkaline-earth metal element at a high degree of dispersion. By contrast, in each manufacturing process of the catalysts C2 and C3 that contains an alkaline-earth metal element in a form of sulfate, an amount of alkaline-earth metal element that dissolves into the solution is relatively small. Thus, the alkaline-earth metal element can be distributed at a higher degree of dispersion. Therefore, the catalysts C2 and C3 are excellent in the HC- and $NO_x$-purifying performances as compared with the catalyst C1.

FIG. 5 is a graph showing an example of influence that a mass ratio of palladium to platinum exerts on the $NO_x$-purifying performance after an endurance test.

The graph shown in FIG. 5 was plotted using the data obtained for the catalysts C4 to C10. In the graph of FIG. 5, the abscissa represents a mass ratio of palladium to platinum, while the ordinate represents 50% purifying temperature for $NO_x$.

As shown in FIG. 5, 50% purifying temperature of 291° C. or less could be achieved in the case where the mass ratio of palladium to platinum was within a range of 2 to 80. Further, in the case where the mass ratio was within a range of 10 to 40, 50% purifying temperature of 281° C. or less could be achieved.

The reason why the 50% purifying temperature is high in the case where the mass ratio of palladium to platinum is small is considered to be as follows. That is, when the mass ratio is decreased, the $NO_x$-purifying performance offered by palladium decreases. On the other hand, the reason why the 50% purifying temperature is high in the case where the mass ratio of palladium to platinum is large is considered to be as follows. That is, when the mass ratio is increased, the effect of platinum on suppressing the sintering of palladium degreases.

FIG. 6 is a graph showing an example of influence that an atomic ratio of an alkaline-earth metal element to a precious metal exerts on the $NO_x$-purifying performance after an endurance test.

The graph shown in FIG. 6 was plotted using the data obtained for the catalysts C3 and C19 to C23. In the graph of FIG. 6, the abscissa represents a mass ratio of barium to precious metal, while the ordinate represents 50% purifying temperature for $NO_x$.

As shown in FIG. 6, 50% purifying temperature of 315° C. or less could be achieved in the case where the atomic ratio of alkaline-earth metal element to precious metal element was within a range of $3.87 \times 10^{-2}$ to $2.71 \times 10$. Further, in the case where the atomic ratio of alkaline-earth metal element to precious metal element was within a range of $7.75 \times 10^{-2}$ to $2.32 \times 10$, 50% purifying temperature of 305° C. or less could be achieved. In addition, in the case where the atomic ratio of alkaline-earth metal element to precious metal element was within a range of $7.75 \times 10^{-2}$ to $1.55 \times 10$, 50% purifying temperature of 301° C. or less could be achieved.

The reason why the 50% purifying temperature is high in the case where the atomic ratio of alkaline-earth metal element to precious metal element is small is considered to be as follows. That is, when the atomic ratio is decreased, the effect of suppressing the poisoning of precious metal by HC degreases. On the other hand, the reason why the 50% purifying temperature is high in the case where the atomic ratio of alkaline-earth metal element to precious metal element is large is considered to be as follows. That is, when the atomic ratio is increased, a larger amount of the precious metal element is covered with the alkaline-earth metal element and/or compounds thereof and the number of the active sites decreases.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising:
   first particles of oxygen storage material;
   second particles of one or more alkaline-earth metal elements and/or compounds thereof interposed between the first particles; and
   third particles of one or more precious metal elements interposed between the first particles,
   wherein a spectrum of a first characteristic X-ray intensity for one of the one or more alkaline-earth metal elements and a spectrum of a second characteristic X-ray intensity for one of the one or more precious metal elements are obtained by performing a line analysis using energy-dispersive X-ray spectrometry along a line having a length of 500 nm, and a correlation coefficient σ(AE, PM) calculated from a mean value $I_{AE}(Av)$ of the first characteristic X-ray intensity and a mean value $I_{PM}(Av)$ of the second characteristic X-ray intensity obtained along the line having a length of 500 nm, respectively, and a mean value $I_{AE}(n)$ of the first characteristic X-ray intensity and a mean value $I_{PM}(n)$ of the second characteristic X-ray intensity that are obtained for an n-th interval of 25 intervals arranged in the line and each having a length of 20 nm, respectively, is 0.70 or more.

2. The exhaust gas-purifying catalyst according to claim 1, wherein the one or more alkaline-earth elements includes barium.

3. The exhaust gas-purifying catalyst according to claim 2, wherein the second particles include barium sulfate.

4. The exhaust gas-purifying catalyst according to claim 1, wherein the second particles include at least a part of the one or more alkaline-earth metal elements in a form of barium sulfate.

5. The exhaust gas-purifying catalyst according to claim 1, wherein the oxygen storage material contains cerium, the one or more alkaline-earth metal elements includes barium, the one or more precious metal elements includes palladium, and the first and second characteristic X-ray intensities are characteristic X-ray intensities of barium and palladium, respectively.

6. The exhaust gas-purifying catalyst according to claim 1, wherein oxygen storage material is a composite oxide containing cerium.

7. The exhaust gas-purifying catalyst according to claim 1, wherein the one or more precious metal elements is palladium and platinum.

8. The exhaust gas-purifying catalyst according to claim 7, wherein a mass ratio of palladium to platinum falls within a range of 2 to 80.

9. The exhaust gas-purifying catalyst according to claim 1, wherein a ratio of a number of mole for the one or more alkaline-earth metal elements to a sum of masses of the first to third particles falls within a range of $3.64 \times 10^{-6}$ to $2.55 \times 10^{-3}$ mol/g.

10. The exhaust gas-purifying catalyst according to claim 1, wherein an atomic ratio of the one or more alkaline-earth metal elements to the one or more precious metal elements falls within a range of $3.87 \times 10^{-2}$ to $2.71 \times 10$.

11. The exhaust gas-purifying catalyst according to claim 1, further comprising fourth particles interposed between the first particles and made of one or more rare-earth elements and/or compounds thereof.

12. The exhaust gas-purifying catalyst according to claim 11, wherein the one or more rare-earth elements includes lanthanum.

* * * * *